US008989196B2

(12) United States Patent
Haddad (10) Patent No.: US 8,989,196 B2
(45) Date of Patent: *Mar. 24, 2015

(54) METHOD AND APPARATUS FOR PROVIDING HOST NODE AWARENESS FOR MULTIPLE NAT64 ENVIRONMENTS

(71) Applicant: Telefonaktiebolaget L M Ericsson (publ), Stockholm (SE)

(72) Inventor: Wassim Haddad, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 49 days.

This patent is subject to a terminal disclaimer.

(21) Appl. No.: 13/903,853

(22) Filed: May 28, 2013

(65) Prior Publication Data

US 2013/0301651 A1    Nov. 14, 2013

Related U.S. Application Data

(63) Continuation of application No. 12/850,488, filed on Aug. 4, 2010, now Pat. No. 8,509,244.

(60) Provisional application No. 61/233,956, filed on Aug. 14, 2009.

(51) Int. Cl.
  *H04L 12/28*    (2006.01)
  *H04J 3/22*     (2006.01)
  *H04L 29/12*    (2006.01)
  *H04L 29/06*    (2006.01)
  *H04L 29/08*    (2006.01)
  *H04W 80/04*    (2009.01)

(52) U.S. Cl.
  CPC ............ *H04L 61/251* (2013.01); *H04W 80/04* (2013.01); *H04L 69/16* (2013.01); *H04L 67/14* (2013.01); *H04L 69/167* (2013.01)

USPC ................ 370/395.53; 370/351; 370/395.54; 370/466; 709/230

(58) Field of Classification Search
None
See application file for complete search history.

(56) References Cited

U.S. PATENT DOCUMENTS

| | | | |
|---|---|---|---|
| 7,245,622 B2 | 7/2007 | Huitema | |
| 7,315,543 B2 | 1/2008 | Takeuchi et al. | |
| 7,526,562 B1 | 4/2009 | Samprathi et al. | |
| 7,573,903 B2 | 8/2009 | Miyata et al. | |

(Continued)

OTHER PUBLICATIONS

Non-Final Office Action, U.S. Appl. No. 12/815,257, dated Jan. 27, 2012, 18 pages.

(Continued)

*Primary Examiner* — Hassan Phillips
*Assistant Examiner* — Saba Tsegaye
(74) *Attorney, Agent, or Firm* — Blakely, Sokoloff, Taylor & Zafman, LLP (57) ABSTRACT

A method is implemented in a host node for communicating with a corresponding node. The host node has connections to a plurality of networks, where each of the plurality of networks includes a network address translation 64 (NAT64) node, each NAT64 node utilizes a distinct prefix to generate virtual Internet Protocol version 6 (IPv6) addresses, each of the plurality of networks is an IPv6 network, but the corresponding node is an Internet protocol version 4 (IPv4) node. The host node implementing this method is able to maintain connectivity with the corresponding node despite having connections to the plurality of networks that each have NAT64 nodes that utilize distinct prefixes for virtual IPv6 addresses.

14 Claims, 6 Drawing Sheets

(56) References Cited

U.S. PATENT DOCUMENTS

| | | | |
|---|---|---|---|
| 7,764,686 | B1 | 7/2010 | Toebes et al. |
| 7,924,832 | B2 | 4/2011 | Li et al. |
| 8,046,452 | B2 | 10/2011 | Hovell et al. |
| 2004/0153502 | A1 | 8/2004 | Jiang |
| 2004/0165602 | A1 | 8/2004 | Park et al. |
| 2004/0190549 | A1 | 9/2004 | Huitema |
| 2005/0083969 | A1 | 4/2005 | Lee et al. |
| 2006/0015647 | A1 | 1/2006 | Kang et al. |
| 2006/0062248 | A1 | 3/2006 | Huang et al. |
| 2006/0259641 | A1 | 11/2006 | Kim et al. |
| 2006/0259969 | A1 | 11/2006 | Suh et al. |
| 2007/0088853 | A1 | 4/2007 | Lee et al. |
| 2008/0114898 | A1 | 5/2008 | Takeda et al. |
| 2008/0267186 | A1 * | 10/2008 | Boukis et al. ......... 370/392 |
| 2008/0273509 | A1 | 11/2008 | Li |
| 2010/0220738 | A1 | 9/2010 | Sarikaya |
| 2011/0038377 | A1 | 2/2011 | Haddad |
| 2011/0208877 | A1 | 8/2011 | Ikeda et al. |
| 2011/0211558 | A1 | 9/2011 | Ikeda et al. |
| 2011/0292850 | A1 | 12/2011 | Oishi et al. |
| 2012/0066695 | A1 | 3/2012 | Berezansky et al. |
| 2012/0259998 | A1 | 10/2012 | Kaufman |

OTHER PUBLICATIONS

Final Office Action, U.S. Appl. No. 12/815,257, dated Aug. 14, 2012, 15 pages.
Non-Final Office Action, U.S. Appl. No. 12/819,074, dated Aug. 20, 2012, 13 pages.
Non-Final Office Action, U.S. Appl. No. 12/850,488, dated Aug. 29, 2012, 14 pages.
Non-Final Office Action, U.S. Appl. No. 12/815,257, dated Jan. 31, 2013, 19 pages.
Non-Final Office Action, U.S. Appl. No. 12/819,074, dated Jan. 25, 2013, 8 pages.
Notice of Allowance, U.S. Appl. No. 12/850,488, dated Feb. 25, 2013, 9 pages.
Notice of Allowance, U.S. Appl. No. 12/819,074, dated Apr. 29, 2013, 10 pages.
Notice of Allowance, U.S. Appl. No. 12/815,257, dated Apr. 26, 2013, 18 pages.
Bagnulo, *NAT64: Network Address and Protocol Translation from IPv6 Clients to IPv4 Servers*; draft-bagnulo-behave-nat64-03.txt, No. 3, Mar. 7, 2009, 28 pages.
Bagnulo, *DNS64: DNS extensions for Network Address Translation from IPv6 Clients to IPv4 Servers* draft-ietf-behave-dns64-00, Jul. 4, 2009, 26 pages.
Bangulo, et al., ""Stateful NAT64: Network Address and Protocol Translation from IPv6 Clients to IPv4 Servers draft-ietf-behave-v6v4-xlate-stateful-08",", IETF, Jan. 2010.
Durand, A., "Dual-stack lite broadband deployments post IPv4 exhaustion draft-ietf-software-dual-lite-03", *Internet Engineering Task Force; Internet Draft*; Feb. 3, 2010; 37 pages.
Johnson, D., et al., "Mobility Support in IPv6 draft-ietf-mext-ric3775bis-04.text", *IETF Mobile IP Working Group*; Jul. 13, 2009; 176 pages.
Soliman, H., ""Mobile IPv6 Support for Dual Stack Hosts and Routers",", *RFC 5555*, Jun. 2009.

\* cited by examiner

METHOD AND APPARATUS FOR PROVIDING HOST NODE AWARENESS FOR MULTIPLE NAT64 ENVIRONMENTS

CROSS-REFERENCE TO RELATED APPLICATION

The present patent application is a Continuation of application Ser. No. 12/850,488, filed Aug. 4, 2010 (issued as U.S. Pat. No. 8,509,244 on Aug. 13, 2013), which claims the benefit of the earlier filing date of U.S. Provisional Patent Application No. 61/233,956, filed Aug. 14, 2009.

FIELD OF THE INVENTION

The embodiments of the invention relate to a method and system for enabling communication between nodes connected through multiple networks with separate network address translation 64 (NAT64) nodes. Specifically, the embodiments of the invention relate to a method and system for enabling Internet protocol version 6 (IPv6) nodes to communicate over multiple networks with an Internet protocol version 4 corresponding node such that connectivity is maintained when communication migrates between networks with different NAT64 nodes.

BACKGROUND

The mobile Internet protocol version 6 (MIPv6) allows a mobile device to maintain a continuous connection with another device that supports Internet protocol version 6. Two separate modes of communication are supported with MIPv6: bi-directional tunneling (BT) mode and route optimization (RO) mode. RO mode dynamically updates the routing of traffic between a mobile device or "mobile node" (MN) and a node that is communicating or corresponding with the mobile node, i.e., a corresponding node (CN).

The BT mode tunnels traffic between the mobile node and the corresponding node through a home agent (HA) device or home agent node on a home network. The home agent node is updated with a location of the mobile node, when the mobile node connects to a new network. The home agent node relays data traffic between the mobile node and the corresponding node.

Both the home and visited or "foreign" networks that the mobile node connects to run IPv6 and can be equipped with network address translation (NAT64) nodes and domain name system 64 (DNS64) servers to enable IPv6 nodes on the respective networks to communicate with the IPv4 nodes outside the IPv6 network by treating outside IPv4 nodes as virtual IPv6-enabled nodes. Under this scheme, nodes in the home or foreign networks will see corresponding nodes that are IPv4 nodes as being IPv6 nodes and will send data packets to a virtual IPv6 destination address assigned to each corresponding node. However, these packets will be captured by the local NAT64 node on each respective network, which will translate the outbound packets into IPv4 packets before being forwarded to the IPv4 destination address of the corresponding node.

Conversely, when communicating with a mobile node or other IPv6 node, the corresponding node operates as if it is connected to an IPv4 node. The corresponding node will send data packets to the mobile node using an IPv4 destination address that has been mapped to the mobile node by the NAT64 of the home network. These packets are intercepted by the NAT64 node located in the home network of the mobile node and translated into IPv6 packets that are forwarded to the mobile node by the home agent node.

Similarly, a multi-homed node is a node that is connected to a plurality of networks and can communicate with a corresponding node over any of the plurality of networks. A connection to a corresponding node can be initiated across any one of the plurality of networks at which point the DNS64 and NAT64 provide a virtual IPv6 address for the IPv4 corresponding node. However, this virtual IPv6 address is valid only for the network in which the DNS64 sits. If the connection to that network becomes unusable or undesirable then a connection with the corresponding node is lost even though the multi-homed node may be connected to the corresponding node or could connect to the corresponding node over another network.

In NAT64/DNS64 technology, each network equipped with DNS64 technology will synthesize locally a different AAAA record (i.e., the DNS record which refers to an IPv6 address) for a particular IPv4 address. Such "fake" or "virtual" IPv6 addresses carry a prefix that is recognizable only by the NAT64 node tied to the DNS64 node that issued it. This prefix identifies the associated data traffic as being directed to an IPv4 node which requires translation. Another NAT64 located in a different network and attached to a different DNS64 is not able to translate the IPv6 addresses of these packets, because it is unaware of the prefix that has been used by the other network and thus is unable to distinguish the virtual IPv6 address with that prefix from an actual IPv6 address.

When a mobile or multi-homed node tries to connect to an IPv4 corresponding node from a network, the network's DNS64 node will synthesize an AAAA record that would carry a virtual IPv6 address known only by that NAT64 node located in this network. However, in the MIPv6 protocol, using the BT mode requires tunneling the data packets to the home network (i.e., the home agent (HA) node, which in turn forwards the data traffic to its final destination). In such cases, data packets tunneled by the mobile node to its home agent node can't be forwarded to the home NAT64 node, because the prefix used to generate the IPv6 address for the corresponding node is unknown to both the home agent node and the home NAT64 node. As a result, connectivity between the corresponding node and mobile node is lost.

Similarly, if a multi-homed node has a connection with a corresponding node through one network, then the virtual IPv6 address for the corresponding node uses a prefix specific to that network. If the connection to that network fails, the multi-homed node cannot utilize other network connections to continue communication with the corresponding node, because the virtual IPv6 address known to the multi-homed node uses a prefix that is unknown to the NAT64s of the other networks and therefore they cannot translate and forward data traffic to the corresponding node.

SUMMARY

A method implemented in a host node for communicating with a corresponding node, where the host node has connections to a plurality of networks, wherein each of the plurality of networks includes a network address translation 64 (NAT64) node, wherein each NAT64 node utilizes a distinct prefix to generate virtual Internet Protocol version 6 (IPv6) addresses, wherein each of the plurality of networks is an IPv6 network, but the corresponding node is an Internet protocol version 4 (IPv4) node, where the host node is able to maintain connectivity with the corresponding node despite having connections to the plurality of networks that each have NAT64 nodes that utilize distinct prefixes for virtual IPv6 addresses, the method comprising the steps of receiving data from an application to be sent to the corresponding node, selecting a connection to one of the plurality of networks through which the data is to be forwarded to the corresponding node, looking up the prefix used by the NAT64 node in the network of the selected connection in a translation binding table maintained by the host node, and sending the data to the corresponding node using a virtual IPv6 address for the corresponding node formed by replacing the prefix in the virtual IPv6 address utilized by a domain name system (DNS 64) with the prefix of the NAT64 node in the network of the selected connection.

A host node having connections to a plurality of networks, wherein each of the plurality of networks includes a network address translation 64 (NAT64) node, wherein each NAT64 node utilizes a distinct prefix to generate virtual Internet Protocol version 6 (IPv6) addresses, wherein at least one of the plurality of networks includes a domain name system 64 (DNS64) node, wherein each of the plurality of networks is an IPv6 network, but the corresponding node is an Internet protocol version 4 (IPv4) node, where the host node is able to maintain connectivity with the corresponding node despite having connections to a plurality of networks that each have NAT64s that utilize distinct prefixes for virtual IPv4 addresses, the host node comprising a multi-network management module configured to establish connections with the corresponding node to provide communication with the corresponding node for applications of the host node, wherein the multi-network management module is further configured to obtain a virtual IPv6 address for the corresponding node from the DNS64 node, wherein the virtual IPv6 obtained from the DNS64 node includes a prefix that is not specific to any of the NAT64 on the plurality of networks, wherein the multi-network management module is further configured to transfer data to the corresponding node using a virtual IPv6 address formed by replacing a prefix in the virtual IPv6 address utilized by the DNS64 server with a prefix corresponding to the NAT64 of the network over which the data is transferred, and a prefix selection module coupled to the multi-network management module, wherein the prefix selection module is configured to look up the prefix corresponding to the NAT64 of the network identified by the multi-network management module and to return said prefix to the multi-network management module, wherein the prefix selection module performs the look up in a translation binding table.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1 and 2. However, it should be understood that the operations of the flow diagrams can be performed by embodiments of the invention other than those discussed with reference to FIGS. 1 and 2, and the embodiments discussed with reference to FIGS. 1 and 2 can perform operations different than those discussed with reference to the flow diagrams of FIGS. 3-6.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: the loss of connectivity with Internet protocol version 4 nodes when a mobile node moves to a foreign network or when a multi-homed node changes the network over which it is attempting to communicate with the corresponding node.

The embodiments of the invention overcome these disadvantages by modifying the functionality of a host node, which can be a mobile node (MN) or multi-homed node, network address translation 64 (NAT64) nodes and domain name system 64 (DNS64) nodes to maintain connectivity without any modifications of the IPv4 network or corresponding node (CN). When the host node connects to a new network it receives an advertisement of the prefix utilized by the NAT64 of that network from the dynamic host control protocol (DHCP) node or access router along with an IPv6 address for that network. The host node stores the prefix along with the IPv6 address associated with this network in a translation binding table. When data is to be sent over any network a look-up of the network in the translation binding table can provide the IPv6 address of the host node in that network and the prefix utilized by the NAT64 in the network. When a connection is initiated with an IPv4 corresponding node, the host node will query the DNS64 of the network over which the communication will occur. The DNS64 will respond with a virtual IPv6 address with a 'generic' or universal prefix. This virtual IPv6 address can then be translated using the prefix of the appropriate network over which the data is to be sent to the IPv4 corresponding node.

Figure 1:
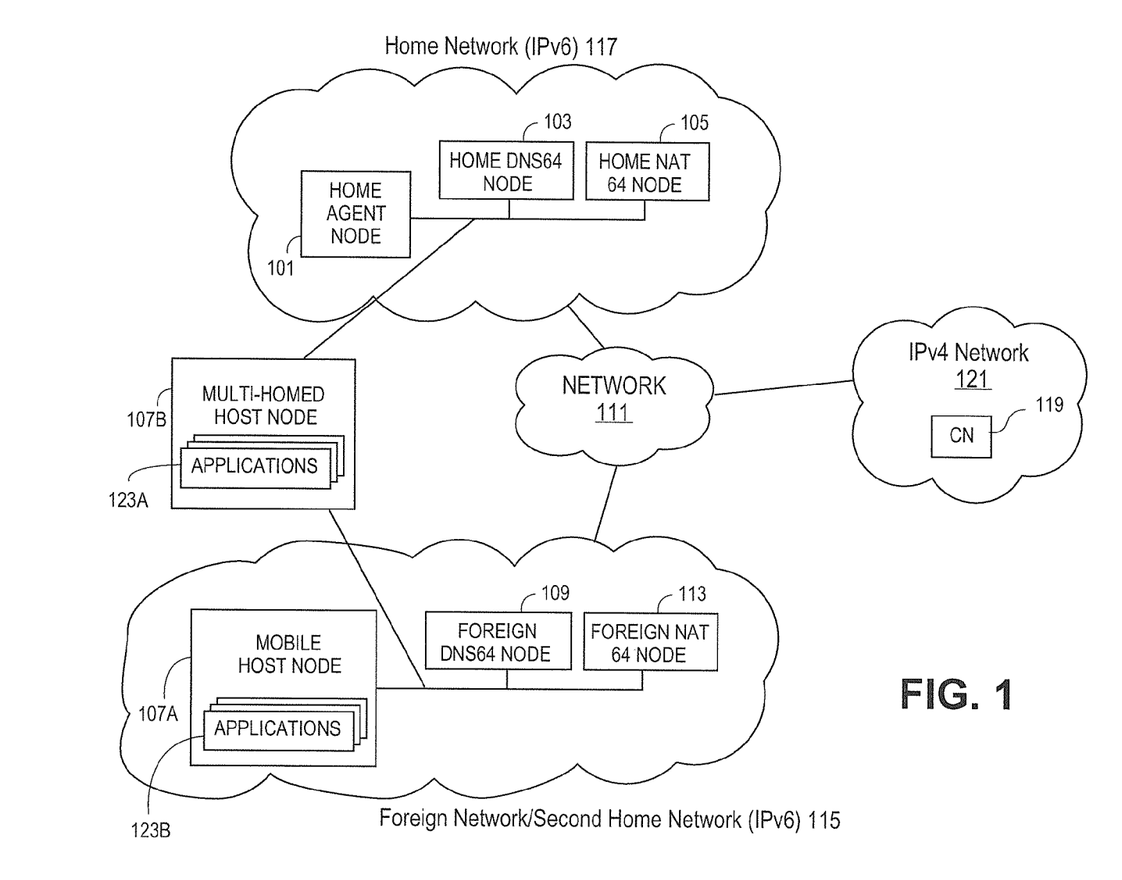
FIG. 1 is a diagram of one embodiment a network environment including a home network, a foreign network and an IPv4 network.

FIG. 1 is a diagram of one embodiment of a network including a home network 117, a foreign network 115, an IPv4 network 121, an intermediate or backbone network 111 that connects any combination of these network and similar communication networks. 'Home' and 'foreign' describe these networks in relation to a mobile node, where the home network includes a home agent for the mobile node. One skilled in the art would understand that the principles and structures described herein can be applied to any two or more IPv6 networks especially in regard to other embodiments where the host node is a multi-homed node rather than a mobile node. In one embodiment, the home network 117 is an IPv6 network and is a home network for a mobile node 107A. The home network 117 can be any type of network including a local area network (LAN), a wide area network (WAN) or similar network.

The home network 117 is in communication with a foreign network 115 and an IPv4 network 121 of the corresponding node (CN) 119 through the intermediate network 111. The intermediate network 111 can be any type of network including a local area network, a wide area network, such as the Internet, or similar network. In other embodiments, the home network 117 is in direct communication with the foreign network 117.

The home network 117 can include a home agent node 101, a home domain name system 64 (DNS64) 103, a home network address translation 64 (NAT64) node and any number of additional computers or devices. The home agent node 101 can be any type of computing device or networking element including a desktop computer, a laptop computer, a server, a router, a console device or a similar device. The home agent node 101 is responsible for facilitating the communication from and to the mobile node 107 regardless of its location.

The home DNS64 node 103 provides domain name look-up services to each of the computing devices within the home network 117. The home DNS64 node 103 can also synthesize an AAAA record for nodes that are on IPv4 networks and have IPv4 addresses. In one embodiment, the home NAT64 node 105 can be implemented in the same computing device or network element as the home DNS64 node 103. In one embodiment, the home NAT64 node 105 can be implemented on a separate device from the home DNS64 node 103. The home DNS64 node 103 and home NAT64 node 105 can be implemented in any type of computing device including a network element, a router, a desktop workstation, a server, a console device or a similar computing device. The home network NAT64 node is responsible for translating IPv4 messages and addresses and mapping them to virtual IPv6 addresses when a node on the home network communicates with an external node that is in the IPv4 network.

A corresponding node, as used herein, refers to a node such as a computing device including a desktop, a workstation, a laptop, a server, a console device or any other type of computing device that is in communication with a host node such as a mobile node 107A belonging to the home network 117 or with a multi-homed node 107B connected to both the home network 117 and foreign network 115. The corresponding node 119 communicates with the mobile node 107A through the home agent node 101. The corresponding node 119 is part of an IPv4 network 121. The corresponding node 119 has an IPv4 address and utilizes IPv4 addresses when communicating with other nodes including the mobile node 107A. This necessitates the use of a NAT64 node 105 on the home network 117.

A foreign network is an IPv6 network 115. An example of a foreign network is a network provided by a business establishment such as a restaurant or hotel, which the user of the mobile node is visiting. While visiting the foreign network 115, the mobile node 107A can continuously correspond with the corresponding node 119 without interruption that would be caused by having to re-establish a connection using the new IPv6 address provided by the foreign DNS64 109. The mobile node 107A can utilize the services of the foreign DNS64 as well as the foreign NAT64 node 113. The foreign DNS64 109 synthesizes an AAAA record for the communication between the mobile node 107A and corresponding node 119. The virtual address and prefix utilized are known only to mobile node 107A, the foreign DNS64 109 and foreign NAT64 node 113. The prefix as used herein refers to the portion of a virtual IPv6 address created for communication with an IPv4 node that identifies the virtual IPv6 address as virtual and requiring translation.

However, since the corresponding node 119 will be sending traffic to the home network 117, for connectivity to be maintained, the mobile node 107A upon switching to the foreign network must continue to use a virtual IPv6 address that it was using to communicate with the corresponding node 119 while on the home network 117. This requires the mobile node 107A to use the prefix of the home network to create the virtual IPv6 address for the corresponding node. The mobile node 107A can use its bindings translation table to obtain the appropriate prefix for the home network. If the connection to the home network is lost the mobile node 107A can also continue to communicate with the corresponding node using the prefix of the foreign network.

In another embodiment, a multi-homed node 107B operates in a similar manner to the mobile node. The multi-homed network does not have a 'foreign' network rather it has connections to multiple 'home' networks 115, 117. The multi-homed network can communicate with a corresponding node 119 using either network interface. The network interface can be changed based on availability, bandwidth, preference or any other basis for switching communications between the networks. The multi-homed node 107B performs a look-up in the translation binding table to obtain the IPv6 address for the multi-homed node and the prefix for the network over which the data is to be sent. The prefix is used to generate a virtual IPv6 address for the corresponding node that can be processed by the selected network.

The corresponding node 119, mobile node 107A and multi-homed node 107B can be any type of computing device including a desktop computer, a laptop computer, a console device, a handheld device, a workstation, a server, a network element or similar computing devices.

Figure 2:
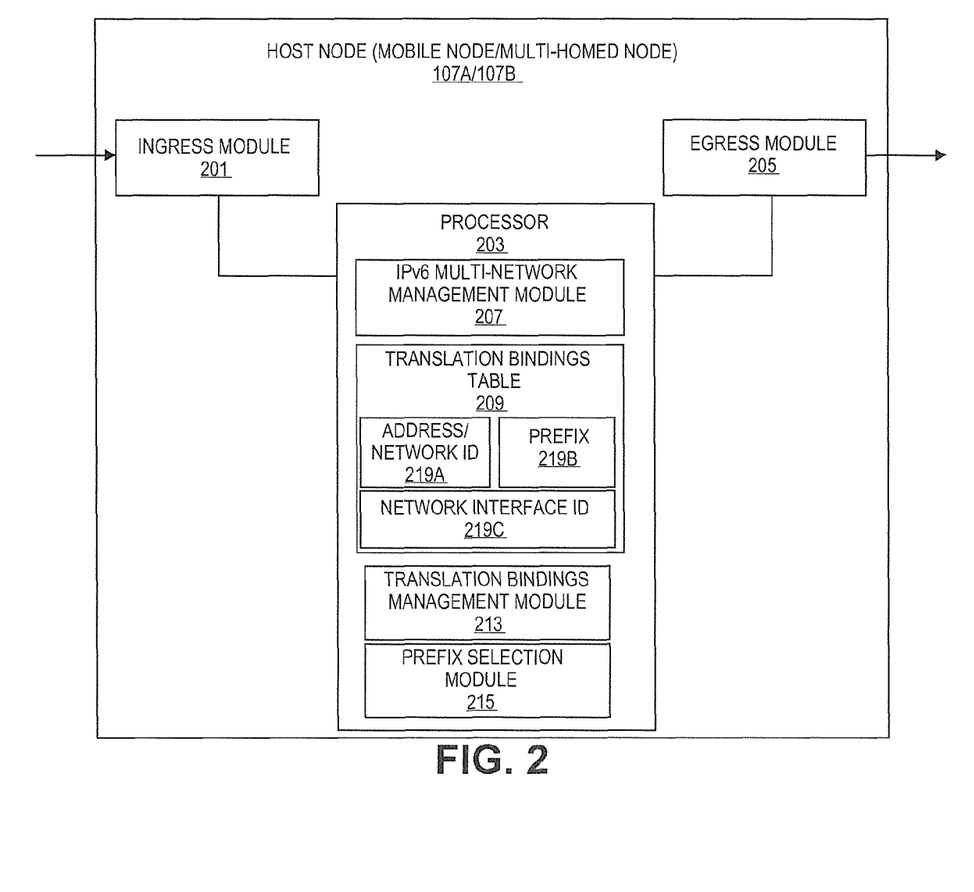
FIG. 2 is a diagram of one embodiment of a host node.

FIG. 2 is a diagram of one embodiment of a host node 107A, 107B. The host node 107A, 107B can include an ingress module 201, an egress module 205 and a processor 203. The ingress module 201 can handle the processing of data packets being received by the host node 107A, 107B at the physical link and data link level. The egress module 205 handles the processing of data packets being transmitted by the network element at the physical link and data link level. The processor 203 handles the routing, forwarding and higher level processing of the data traffic. The processor 203 can execute or include an IPv6 multi-network management module 207, translation binding table 209, translation bindings management module 213 and a prefix selection module 215. The processor 203 can be a general purpose processor such as a central processing unit or a specialized network processor. One of ordinary skill in the art would understand that the host node 107A, 107B can be any type of computing device and would include memory devices, persistent storage, buses and similar standard computer architecture. These elements have been omitted for sake of clarity.

The multi-network management module 207 manages ingress and egress traffic at the higher levels including the Internet Protocol level. The multi-network management module facilitates the forwarding of traffic toward its destination within the host node 107A, 107B and external to the host node 107A, 107B. Egress traffic is checked to determine the network interface to be utilized for forwarding. Also, the destination address is checked to determine whether it is a virtual address. A virtual address will include the generic prefix utilized by all DNS64 nodes. The virtual addresses are translated by the replacing the generic prefix with prefix for the network corresponding to the network interface for the egress data traffic. The multi-network management module 107 calls a prefix selection module to determine the appropriate prefix to utilize for the virtual address of the egress traffic. For ingress data traffic, if the ingress data traffic has reached its destination then a check can be made to determine whether the source address is a virtual address by comparison with the prefix for the network interface the data traffic was received from. The prefix for the network interface can be obtained from the prefix selection module 215. If the ingress traffic does include a virtual IPv6 source address then the source address can be translated to include the generic prefix, which is known to the application or similar recipient of the ingress data traffic.

The prefix selection module 215 resolves which prefixes are utilized for each of the network interfaces of the host node 107A, 107B. The prefix selection module 215 can perform a look-up using the translation bindings table 209 to obtain the prefix 219B and address 219A or network identifier for the host node for each network interface identifier 219C. The prefix selection module 215 can receive the network interface identifier 219C or similar indicator of a network onto which traffic is to be forwarded of from which it has been received from the multi-network management module 217. The address 219A is the IPv6 address assigned by a DHCP server on the corresponding network. The prefix 219B is the prefix utilized by the NAT64 on the corresponding network.

The translation bindings table 209 can be maintained by the translation bindings management module 213. The translation bindings management module 213 receives the advertisement of the prefix for each network from the respective DHCP server, access router or similar source upon connection to that network. The translation bindings management module 213 then creates a translation binding entry 219 in the translation bindings table 209. The translation binding entry 219 includes the address 219A for the host node in the new network, a prefix 219B for the new network and a network interface identifier 219C or similar indicator of the corresponding network interface between the host node 107A, 107B and the corresponding network.

Figure 3:
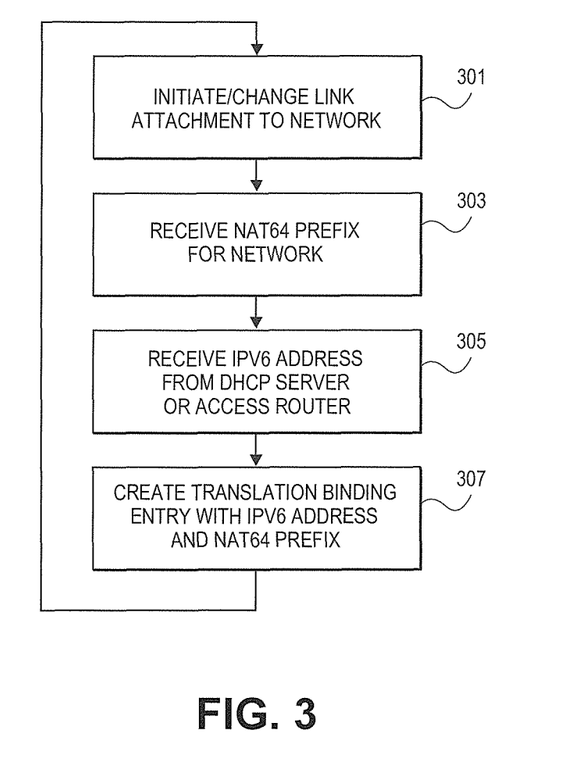
FIG. 3 is a flowchart of one embodiment of a process for initiating a connection or a link to a network.

FIG. 3 is a flowchart of one embodiment of a process for an attachment of a host node to a new network. In one embodiment, when the host node is connected to a new network, a process is initiated to establish a connection with that new network (Block 301). The connection type can be any type of connection including a wireless connection or a wired connection. In addition, the connection may be a virtual connection such as a virtual private network connection or similar connection to a network.

In response to connecting to the new network the NAT64 prefix will be received or advertised on the network (Block 303). This is the prefix utilized by the NAT64 node of the new network to identify virtual IPv6 addresses that are mapped to an IPv4 corresponding node. This NAT64 prefix may be advertised by the DHCP server, access router, DNS64 node 64 or NAT64 node or similar service on the new network.

In one embodiment, the IPv6 address for the host node on the new network can be manually or automatically configured, received from a DHCP server, or received from a similar source for obtaining an address on a new network (Block 305). In other embodiments, the IPv6 address can be received prior to the NAT64 prefix in parallel with the NAT64 prefix or similarly received in roughly the same time frame or process as the NAT64 prefix is received. In other embodiments, the NAT64 prefix may have to be requested in response to receiving the IPv6 address from the DHCP server or similar source. In other embodiments, the IPv6 address is not received from a DHCP server. The host node can be manually or automatically configured.

The NAT64 prefix and the IPv6 address assigned to the host node by the DHCP server or access router can be utilized to create a translation binding entry in a translation bindings table (Block 307). As described further herein below, these translation bindings can be utilized to maintain connectivity with the corresponding node regardless of a change of network interface through which host node forwards traffic to the corresponding node.

Figure 4:
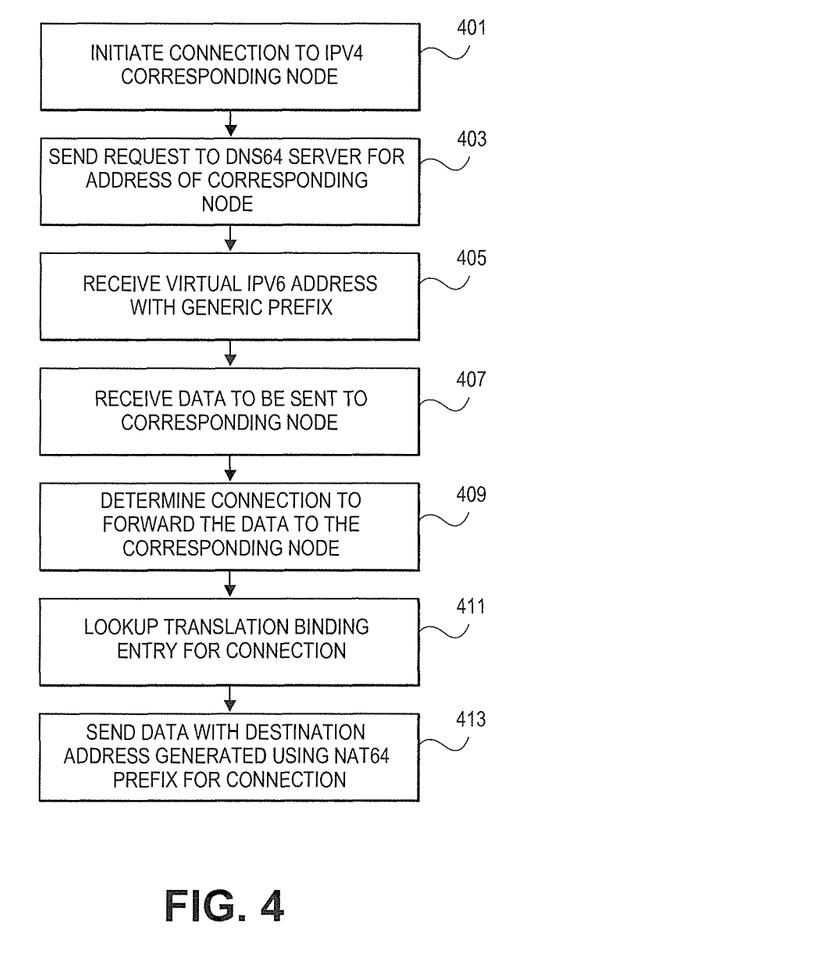
FIG. 4 is a flowchart of one embodiment of a process for initiating a connection with a corresponding node.

FIG. 4 is a flowchart of one embodiment of a process for initiating a connection to an IPv4 corresponding node by a host node. In one embodiment, this process is initiated to establish a connection to an IPv4 corresponding node on behalf of an application or similar program within the host node or associated computer (Block 401).

The host node then sends a request to the DNS64 node for the address of the corresponding node specified by the application or similar source (Block 403). This includes the use of a uniform resource locator (URL) to identify the corresponding node. The application or similar program establishing a connection to the corresponding node can provide any type of identifier or use any type of request to the DNS64 node to obtain an address for the corresponding node. The DNS64 node is a node in a network that the host node has an established connection to, such as a home network or foreign network. In other embodiments, the DNS64 can be on any network in communication with the host node.

In response to sending the request to the DNS64 node for the address of the corresponding node, the DNS64 node returns a virtual IPv6 address for the corresponding node where the IPv6 address includes a generic prefix (Block 405). The generic prefix enhances the ability of the DNS64 node to participate in the NAT process and essentially serves to notify the host node that the data associated with a virtual address is actually originating from an IPv4 device and a careful selection of the response prefix is required. The generic prefix can have any value. In one embodiment, the generic prefix has all leading zeros or a combination of leading zeros and logical ones such as ::FFFF, wherein :: indicates leading zeros and FFFF logical ones. The selection of the prefix can be such that a simple operation such as an XOR can be used to translate the virtual address from one with the generic prefix to one with a network specific prefix.

At any time after the generic prefix has been received, the data destined for the corresponding node is received or sent to the corresponding node (Block 407). A determination as to which connection or network interface is to be used the data to the corresponding node is made (Block 409). The network interface can be selected by a sender or by similar methods. A look-up operation is then performed using the designated network identifier or similar indicator of the connection or network interface to be utilized to send the data to the corresponding node. A translation binding entry for the connection or network interface is then accessed or retrieved (Block 411). The translation binding entry contains the IPv6 address of the host node and the prefix for the network corresponding to the translation binding entry. Then the data is sent to a destination address generated using the NAT64 prefix for the connection or network interface (Block 413). The source address for the data traffic is the IPv6 address of the host node for the corresponding network.

Figure 5:
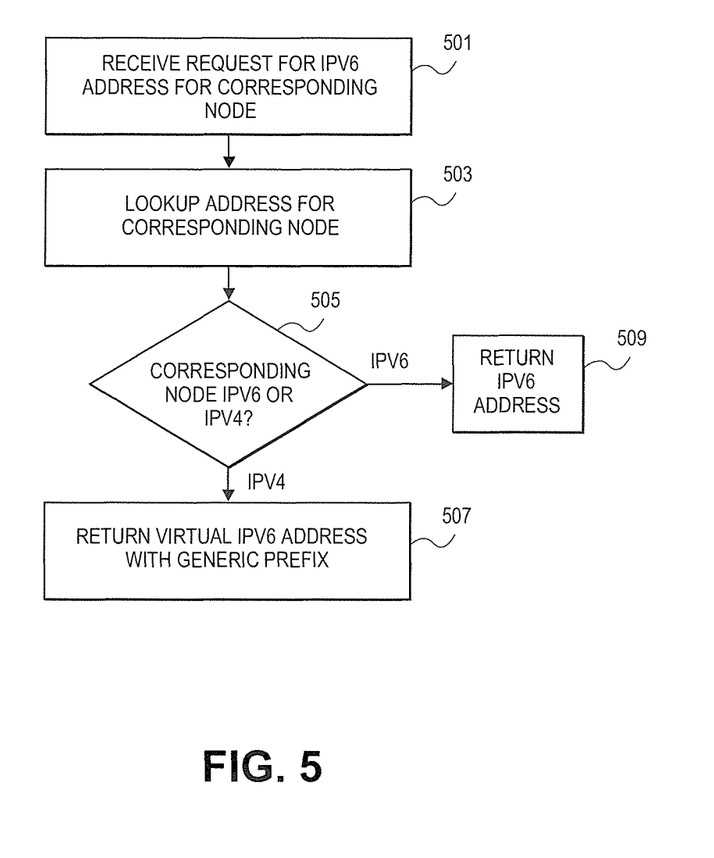
FIG. 5 is a flowchart of one embodiment of a process for servicing a domain name system (DNS) lookup for a corresponding node.

FIG. 5 is a flowchart of one embodiment of the process for handling traffic between an IPv6 host node and an IPv4 corresponding node by a DNS64 node. In one embodiment, the process is initiated by the DNS64 receiving a request for an IPv6 address for a corresponding node (Block 501). A look-up operation or address determination operation for the corresponding node is executed (Block 503). The operations include the determination as to whether the corresponding node is an IPv6 or an IPv4 node (Block 505). If the corresponding node is an IPv6 node then the appropriate IPv6 address is simply returned to the requesting host node. However, if the corresponding node is an IPv4 node, then a virtual IPv6 address is returned to the requesting host node where the virtual IPv6 address is generated by appending a generic prefix to the IPv4 address. The generic prefix can be a prefix that has been defined or agreed upon to be used by all DNS64 to identify a virtual IPv6 address that has been mapped to an IPv4 address. Any prefix or range of prefixes can be utilized for this purpose.

Figure 6:
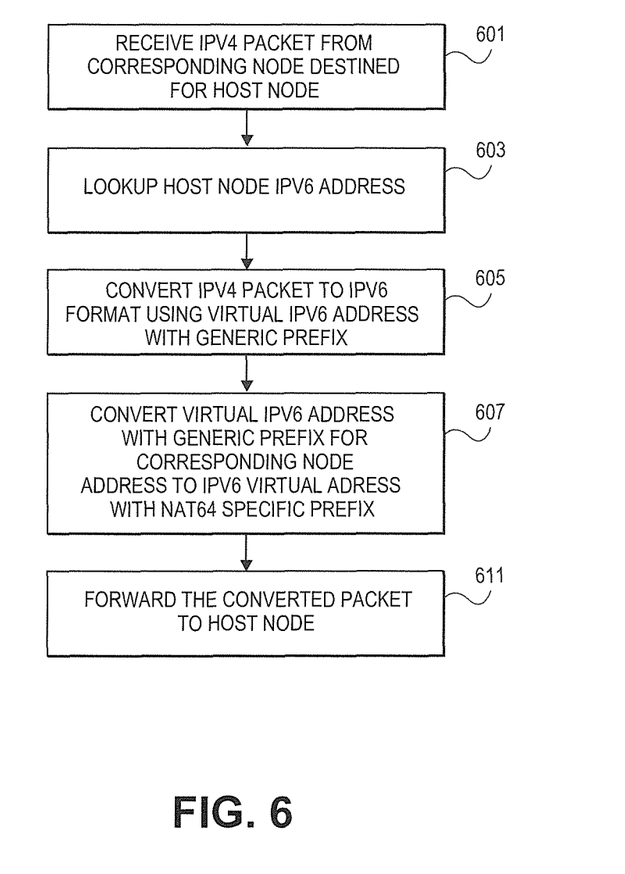
FIG. 6 is a flowchart of one embodiment of a process for processing incoming traffic from an IPv4 corresponding node.

FIG. 6 is flowchart of one embodiment of a process for processing the incoming packets from the corresponding node by a NAT64 node. In one embodiment, the process is initiated by the corresponding node, or more specifically a program or an application of the corresponding node sending IPv4 data packets to the host node. These data packets are intercepted or received by the NAT64 of the network corresponding to the destination address of the host node utilized by the corresponding node (Block 601). A look-up operation is performed by the NAT64 to determine the host node for the incoming message and to determine the appropriate IPv6 address for the host node (Block 603). The destination address in the incoming data packets is an IPv4 address that belongs to the NAT64 or that is associated with the NAT64.

The corresponding node communicates using the IPv4 protocol and using an IPv4 address for the host node. The IPv4 packet is then converted to an IPv6 formatted packet including the virtual IPv6 address of the corresponding node using the generic prefix as the source address of the data packet (Block 605). The virtual IPv6 address using the generic prefix is then converted from the generic prefix to an IPv6 virtual address with a NAT64 specific prefix (Block 607). The data packet is initially created using the virtual IPv6 address with the generic prefix to ensure that the data packet header and similar aspects of the data packet correspond to the virtual IPv6 address with the generic prefix, because the application or program that receives the data packet at the host node is only aware of this address for the corresponding node and the source address will be converted back to this virtual IPv6 address at the host node. The converted data packet is then forwarded to the host node (Block 611).

Thus, a method, system and apparatus for enabling multi-network communication with NAT64 has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a host node for communicating with a corresponding node, where the host node has connections to a plurality of networks, wherein each of the plurality of networks includes a network address translation 64 (NAT64) node, wherein each NAT64 node utilizes a distinct prefix to generate virtual Internet Protocol version 6 (IPv6) addresses, wherein each of the plurality of networks is an IPv6 network, but the corresponding node is an Internet protocol version 4 (IPv4) node, where the host node is able to maintain connectivity with the corresponding node despite having connections to the plurality of networks that each have NAT64 nodes that utilize distinct prefixes for virtual IPv6 addresses, the method comprising the steps of:

receiving data from an application to be sent to the corresponding node;

selecting a connection to one of the plurality of networks through which the data is to be forwarded to the corresponding node;

looking up the prefix used by the NAT64 node in the network of the selected connection in a translation binding table maintained by the host node; and sending the data to the corresponding node using a virtual IPv6 address for the corresponding node formed by replacing the prefix in the virtual IPv6 address utilized by a domain name system 64 (DNS64) with the prefix of the NAT64 node in the network of the selected connection.

2. The method of claim 1, wherein the host node is a mobile node and one of the plurality of networks is a home network for the mobile node, and wherein the method further comprising the steps of:

tunneling the data to a home agent node in the home network using a virtual IPv6 address with the prefix of the home network's NAT64 node.

3. The method of claim 1, further comprises the steps of:
changing the selected connection to a connection with another one of the plurality of networks; and
looking up a prefix for a NAT64 node in the network of the newly selected connection in the translation binding table; and
sending the data to corresponding node using a virtual IPv6 address for the corresponding node with the prefix of the NAT64 node in the network of the newly selected connection.

4. The method of claim 1, further comprising the step of:
receiving the prefix utilized by each of the NAT64 nodes from a dynamic host configuration protocol (DHCP) server or access router server upon connection to the respective network.

5. The method of claim 1, further comprising the step of:
storing the prefix utilized by the NAT64 nodes as a translation binding entry in the translation binding table.

6. The method of claim 1, wherein the prefix of the virtual IPv6 address provided by the DNS64node is universal to all DNS64servers.

7. The method of claim 1, wherein the host node is a multi-homed node.

8. A host node having connections to a plurality of networks for communicating with a corresponding node, wherein each of the plurality of networks includes a network address translation 64 (NAT64) node, wherein each NAT64 node utilizes a distinct prefix to generate virtual Internet Protocol version 6 (IPv6) addresses, wherein at least one of the plurality of networks includes a domain name system 64 (DNS64) server, wherein each of the plurality of networks is an IPv6 network, but the corresponding node is an Internet protocol version 4 (IPv4) node, where the host node is able to maintain connectivity with the corresponding node despite having connections to a plurality of networks that each have NAT64s that utilize distinct prefixes for virtual IPv4 addresses, the host node comprising:

a multi-network management module configured to establish connections with the corresponding node to provide communication with the corresponding node for applications of the host node, wherein the multi-network management module is further configured to transfer data to the corresponding node using a virtual IPv6 address formed by replacing a prefix in the virtual IPv6 address utilized by the DNS64server with a prefix corresponding to the NAT64 of the network over which the data is transferred; and a prefix selection module coupled to the multi-network management module, wherein the prefix selection module is configured to look up the prefix corresponding to the NAT64 of the network identified by the multi-network management module and to return said prefix to the multi-network management module, wherein the prefix selection module performs the look up in a translation binding table.

9. The host node of claim 8, further comprising:
a translation binding table coupled to the prefix selection module, wherein the translation binding table is configured to store a plurality of translation binding entries that contain a prefix for each NAT64 of the plurality of networks.

10. The host node of claim 9, further comprising:
a binding management module that is configured to receive the prefix of each NAT64 from the dynamic host configuration protocol (DHCP) server or access router upon connection to the respective network.

11. The host node of claim 10, wherein the bindings management module is further configured to store the prefix of each NAT64 as a translation binding entry in the translation binding table.

12. The host node of claim 8, wherein the multi-network management module is further configured to change the network over which the data is transferred to the corresponding node and to utilize the prefix of the NAT64 of the new network over which the data is transferred.

13. The host node of claim 8, wherein the host node is a mobile node having a home network, wherein the multi-network management module transfers the data to the corresponding node by tunneling the data to a home agent node on a home network using a virtual IPv6 address with the prefix of the home network NAT64.

14. The host node of claim 13, wherein the mobile node has multiple home networks.

* * * * *

UNITED STATES PATENT AND TRADEMARK OFFICE
CERTIFICATE OF CORRECTION

PATENT NO. : 8,989,196 B2  
APPLICATION NO. : 13/903853  
DATED : March 24, 2015  
INVENTOR(S) : Haddad It is certified that error appears in the above-identified patent and that said Letters Patent is hereby corrected as shown below:

On the Title Page

On Page 2, Item (56), under "OTHER PUBLICATIONS", in Column 2, Line 19, delete "Bangulo," and insert -- Bagnulo, --, therefor.

On Page 2, Item (56), under "OTHER PUBLICATIONS", in Column 2, Line 26, delete "ric3775bis-04.text"," and insert -- rfc3775bis-04.text", --, therefor.

In the Specification

In Column 6, Line 6, delete "117." and insert -- 115. --, therefor.

In the Claims

In Column 12, Line 2, in Claim 8, delete "NAT64s" and insert -- NAT64 --, therefor.

Signed and Sealed this  
Eleventh Day of August, 2015

Michelle K. Lee  
*Director of the United States Patent and Trademark Office*